United States Patent
Araki et al.

(10) Patent No.: US 8,507,593 B2
(45) Date of Patent: Aug. 13, 2013

(54) PRIMER COMPOSITION

(75) Inventors: Kiminori Araki, Hiratsuka (JP); Hiroyuki Wakamatsu, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/424,601

(22) Filed: Mar. 20, 2012

(65) Prior Publication Data

US 2012/0252944 A1 Oct. 4, 2012

(30) Foreign Application Priority Data

Mar. 29, 2011 (JP) ................................. 2011-073625

(51) Int. Cl.
  *C08K 5/15* (2006.01)
  *C08K 5/54* (2006.01)
  *C08K 5/29* (2006.01)

(52) U.S. Cl.
  USPC ............................ 524/110; 552/188; 552/196

(58) Field of Classification Search
  USPC .......................................... 524/110, 188, 196
  See application file for complete search history.

(56) References Cited

U.S. PATENT DOCUMENTS

2009/0104464 A1 * 4/2009 Galbo et al. .................. 428/461

FOREIGN PATENT DOCUMENTS

| JP | 2000-063768 | 2/2000 |
|---|---|---|
| JP | 2000-327956 | 11/2000 |
| JP | 2001-123092 | 5/2001 |
| JP | 2006-335921 | 12/2006 |
| JP | 2007-051287 | 3/2007 |
| JP | 2009-280682 | 12/2009 |
| JP | 2011-252066 | 12/2011 |

* cited by examiner

*Primary Examiner* — Kriellion Sanders
(74) *Attorney, Agent, or Firm* — Thorpe North & Western LLP

(57) ABSTRACT

A primer composition including a binder resin, a compound (A) expressed by general formula (1) below or a hydrate thereof, and a solvent. In such a primer composition, a content of the compound (A) is not less than 0.1 mass % and not more than 1.5 mass %.

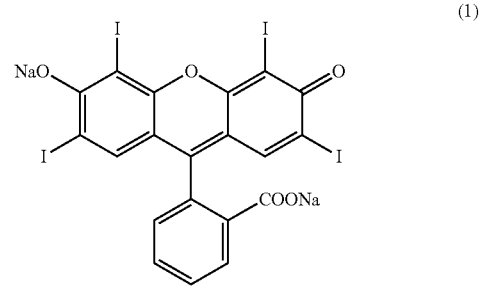

(1)

18 Claims, No Drawings

PRIMER COMPOSITION

PRIORITY CLAIM

Priority is claimed to Japan Patent Application Serial No. 2011-073625 filed on Mar. 29, 2011.

BACKGROUND

1. Technical Field

The present technology relates to a primer composition.

2. Related Art

Generally, a window sealant is used to adhere a window pane to a body of an automobile, but in many cases, it is not possible to obtain sufficient adhesion when the adhering is performed using only the window sealant. In such cases where sufficient adhesion cannot be obtained using a sealant or adhesive alone, sufficient adhesion is ensured by first applying a primer composition to an adhering surface and, thereafter, applying an adhesive thereon (e.g. see Japanese Unexamined Patent Application Publication No. 2007-51287A, Japanese Unexamined Patent Application Publication No. 2006-335921A, Japanese Unexamined Patent Application Publication No. 2001-123092A, Japanese Unexamined Patent Application Publication No. 2000-63768A, Japanese Unexamined Patent Application Publication No. 2000-327956A, and Japanese Unexamined Patent Application Publication No. 2009-280682A).

However, when a resin component used in the primer composition is transparent, there are cases where it is extremely difficult to determine whether or not the primer composition has been applied to the adherend.

SUMMARY

The present technology provides a primer composition by which it is easy to determine whether or not the primer composition has been applied.

Specifically, the present technology provides the following (1) to (6).

(1) A primer composition including a binder resin, a compound (A) expressed by general formula (1) below or a hydrate thereof, and a solvent. In such a primer composition, a content of the compound (A) is not less than 0.1 mass % and not more than 1.5 mass %.

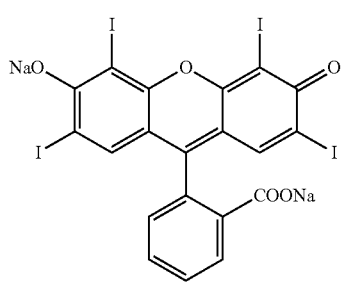

(2) The primer composition described in (1), further including at least one of a polyisocyanate compound, an isocyanate silane compound, and a silane compound.

(3) The primer composition described in (1) or (2), wherein the binder resin includes at least one of a polyurethane-based resin and a polyacryl-based resin.

(4) The primer composition described in (2) or (3), wherein the polyisocyanate compound is a tris(phenyl isocyanate) thiophosphate.

(5) The primer composition described in (2) or (3), wherein the isocyanate silane compound is a product of reacting: a compound (a) obtained by reacting trimethylolpropane and hexamethylene diisocyanate; and an aminosilane compound (b) including at least one phenyl group and a carbon bonded to an NH.

(6) The primer composition described in (2) or (3), wherein the silane compound includes at least one type of reactant selected from a compound (1) expressed by general formula (2) below, a compound (2) expressed by general formula (3) below, and a compound (3) expressed by general formula (4) below:

COMPOUND (1)

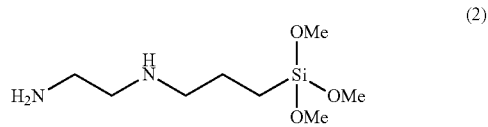

COMPOUND (2)

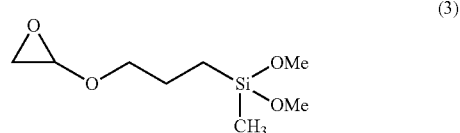

COMPOUND (3)

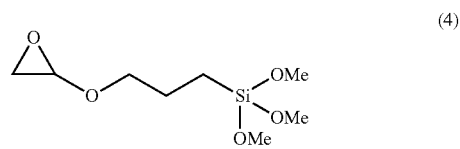

According to the present technology, a primer composition can be provided by which it is easy to determine whether or not the primer composition has been applied.

DETAILED DESCRIPTION

The present technology is explained in detail below. However, the present technology is not limited by the embodiments of the technology (hereinafter referred to as the "embodiments") described hereinafter. Furthermore, the constituents described in the embodiments include constituents that could be easily conceived by a person skilled in the art and constituents that are essentially identical, or, in other words, are equivalent in scope. Moreover, the constituents described in the embodiments can be combined as desired.

The primer composition according to an embodiment will be described hereinafter. The primer composition according to this embodiment includes a binder resin, a compound (A) expressed by general formula (1) below or a hydrate thereof, and a solvent. In such a primer composition, a content of the compound (A) is not less than 0.1 mass % and not more than 1.5 mass %. Hereinafter, the primer composition of this embodiment is also referred to as the "primer composition of this embodiment". Next, components included in the primer composition of this embodiment will be described.

Binder Resin Component

The binder resin component included in the primer composition of this embodiment includes at least one of a polyurethane-based resin and a polyacryl-based resin.

The binder resin component described above is a resin that, for reasons described hereinafter, includes at least one of a polyacrylate resin and a polyurethane resin, and preferably includes a resin having a number average molecular weight of not less than 15,000. Furthermore, the number average molecular weight of the polyacrylate resin is preferably not less than 3,000 and not more than 150,000, and the number average molecular weight of the polyurethane resin is preferably not less than 3,000 and not more than 60,000.

The primer composition of this embodiment is provided with superior membrane strength at an initial period of adhesion due to the including of the resin having a high molecular weight described above. Additionally, adhesion to various adherends will be superior due to the including of the resin. A single resin may be used or a combination of two types of resin may be used.

Polyacrylate Resin

It is preferable that a polyacrylate resin is used as the binder resin because adhesion with respect to window cleaners and adhesion at low temperatures will be superior.

The polyacrylate resin is a polymer including an acrylic ester and/or methyl methacrylate and, though not particularly limited, preferably is a copolymer of methyl acrylate and methyl methacrylate because water resistant adhesion with respect to non-adhesive/non-adhesive coated acrylic-melamine boards will be more excellent. Additionally, a copolymerization molar ratio (methyl acrylate/methyl methacrylate) of the methyl acrylate to the methyl methacrylate is not particularly limited.

Commercially available products such as a polyacrylate resin (Delpowder 80N, manufactured by Asahi Kasei Corporation; number average molecular weight: 100,000), a polyacrylate resin (Delpowder 720V, manufactured by Asahi Kasei Corporation; number average molecular weight: 65,000), a polyacrylate resin (Gemlac YC-3623, manufactured by Kaneka Corporation; number average molecular weight: 35,000), and the like can be suitably used as the polyacrylate resin.

Polyurethane Resin

It is preferable that a polyurethane resin is used as the binder resin because initial adhesion will be superior. The polyurethane resin is not particularly limited, and is obtained by copolymerizing monomers via urethane bonds that can be formed by condensing isocyanate groups and alcohol groups.

Commercially available products such as a polyurethane resin (Pandex T-5205, manufactured by DIC Corporation; number average molecular weight: 60,000), a polyurethane resin (Pandex T-5201, manufactured by DIC Corporation; number average molecular weight: 55,000), and the like can be suitably used as the polyurethane resin.

Compound A (Dye)

A compound A (dye) included in the primer composition of this embodiment is a dye and/or a pigment that is achromatized by exposure to ultraviolet rays or infrared rays. A content of the compound A (dye) is not less than 0.1 mass % and not more than 2.5 mass % of a total mass of the primer composition of this embodiment. With the primer composition of this embodiment that is compounded with the content of the compound A described above, it is easy to determine whether or not the primer composition has been applied to an adhering surface because visibility can be obtained due to an appropriate amount of coloration being developed. Additionally, even in cases when the primer composition of this embodiment protrudes from the adhering surface, the aesthetics will not be negatively affected because this coloration can be achromatized by intentional irradiation with ultraviolet light or exposure to the outdoors. From the perspective of enhancing the effects described above, the content of the compound A is preferably not less than 0.1 mass % and not more than 2.0 mass %, and more preferably not less than 0.1 mass % and not more than 1.5 mass % of the total mass of the primer composition of this embodiment.

In this embodiment, examples of a single compound A (dye) having achromatizing functionality include compounds expressed by general formula (1) below or hydrates thereof. Commercially available products can also be suitably used as the single compound A having achromatizing functionality, and examples thereof include Erythrosine, manufactured by Kiriya Chemical Co., Ltd., and the like.

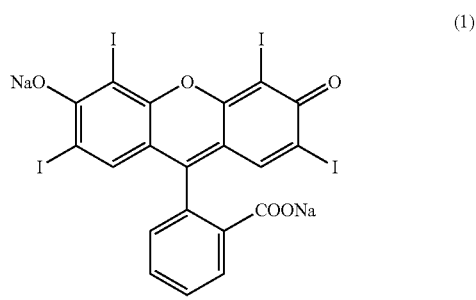

(1)

Solvent

The primer composition of this embodiment further includes a solvent. A content of the solvent is preferably not less than 60 mass % and more preferably not less than 60 mass % and not more than 95 mass % of the gross mass (total mass) of the primer composition of this embodiment. When the content is within this range, excellent applicability can be obtained. The solvent is not particularly limited and a wide range of known solvents can be used including organic solvents, water soluble solvents, and the like. Examples of the solvent include hydrocarbon-based solvents such as benzene, toluene, xylene, hexane, heptane, octane, cyclohexane, and the like; halogenated hydrocarbon-based solvents such as tetrachloromethane, methylene chloride, and the like; ketone-based solvents such as acetone, methyl ethyl ketone, methyl isobutyl ketone, cyclohexanone, and the like; ether-based solvents such as diethylether, tetrahydrofuran, dioxane, and the like; ester-based solvents such as methyl acetate, ethyl acetate, butyl acetate, and the like; ether ester-based solvents such as cellosolve acetate, butyl cellosolve acetate, and the like; alcohol-based solvents such as methanol, ethanol, propanol, i-propanol, n-butanol, and the like; petroleum-based solvents from gasoline through kerosine distillate such as mineral spirits and the like; N-methyl-2-pyrrolidone; N,N-dimethylformamide; dimethyl acetamide; and the like. A single solvent may be used or a combination of two or more of these solvents may be used. From the perspective of enhancing adhesion speed, methyl ethyl ketone and ethyl acetate are particularly preferable. Note that the solvents described above are preferably used after being subjected to sufficient drying or dewatering. The content of the solvent in the primer composition of this embodiment can be adjusted as appropriate depending on the use, purpose, or other specification of the primer composition.

Polyisocyanate Compound

The primer composition of this embodiment can also include a polyisocyanate compound. The polyisocyanate compound included in the primer composition of this embodiment is a polyisocyanate having two or more isocyanate groups. The primer composition of this embodiment can enhance adhesion, especially initial adhesion and water resistant adhesion with respect to non-adhesive/non-adhesive coated boards, by including the polyisocyanate compound described above. Additionally, when the primer composition includes the polyisocyanate compound, visibility when applying, achromatization over time, and adhesion of the primer composition are superior.

Examples of the polyisocyanate compound include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMHDI), tolidine diisocyanate (TODI), 1,5-naphthalene diisocyanate (NDI), triphenylmethane triisocyanate, and the like; aliphatic polyisocyanates such as hexamethylene diisocyanate (HDI), trimethylhexamethylene diisocyanate (TMHDI), lysine diisocyanate, norbornane diisocyanate (NBDI), and the like; alicyclic polyisocyanates such as transcyclohexane-1,4-diisocyanate, isophorone diisocyanate (IPDI), bis(isocyanate methyl)cyclohexane ($H_6$XDI), dicyclohexylmethane diisocyanate ($H_{12}$MDI), and the like; carbodiimide-modified polyisocyanates thereof; isocyanurate-modified polyisocyanates thereof; and the like. A single polyisocyanate compound may be used or a combination of two or more polyisocyanate compounds may be used.

In this embodiment, from the perspective of obtaining more excellent initial adhesion and water resistant adhesion with respect to non-adhesive/non-adhesive coated boards, the polyisocyanate compound preferably has three or more isocyanate groups. Suitable examples of the polyisocyanate compound having three or more isocyanate groups include a tris(phenyl isocyanate) thiophosphate expressed by general formula (5) below, a polymethylene polyphenyl isocyanate expressed by general formula (6) below, polyisocyanate compounds having isocyanurate rings, and the like. A single polyisocyanate compound may be used or a combination of two or more polyisocyanate compounds may be used.

Among these, a combination of tris(phenyl isocyanate) thiophosphate and/or polymethylene polyphenyl isocyanate and a polyisocyanate compound having isocyanurate rings is preferably used. Additionally, a combination of tris(phenyl isocyanate)thiophosphate and a polyisocyanate compound having isocyanurate rings can also be preferably used. By using the combinations described above, initial adhesion and water resistant adhesion with respect to non-adhesive/non-adhesive coated boards can be significantly enhanced.

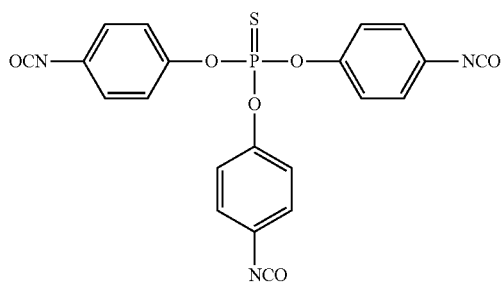

(5)

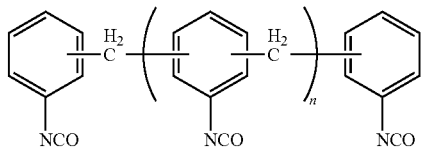

(6)

In general formula (6), n is an integer not less than 1 and not greater than 5, and is preferably an integer of not less than 1 and not greater than 3.

An isocyanurate variant of the diisocyanate compound obtained by trimerizing a diisocyanate compound can be suitably used as the polyisocyanate compound having isocyanurate rings. Examples of the diisocyanate compound include the aromatic polyisocyanates described above and the like. Among these, from the perspectives of obtaining more excellent initial adhesion and water resistant adhesion with respect to non-adhesive/non-adhesive coated board, and sufficient adhesion when used in low-temperature environments, the polyisocyanate compound having isocyanurate rings obtained by reacting a mixture of TDI and HDI is preferable.

A content of the polyisocyanate compound is preferably not less than 50 parts by mass and not more than 3,000 parts by mass per 100 parts by mass of the binder resin. When the content is within this range, initial adhesion and water resistant adhesion with respect to non-adhesive/non-adhesive coated boards will be more excellent, and sufficient adhesion when used in low-temperature environments can be obtained.

Examples of commercially available products that can be suitably used as the polyisocyanate compound include a tris(phenyl isocyanate) thiophosphate (Desmodur RFE, manufactured by Sumika Bayer Urethane Co., Ltd.), a polyisocyanate compound having isocyanurate rings obtained by reacting a mixture of HDI and TDI (Desmodur HL, manufactured by Sumika Bayer Urethane Co., Ltd.), a polymethylene polyphenyl isocyanate (Sumidur 44V-10, manufactured by Sumika Bayer Urethane Co., Ltd.), and the like.

Isocyanate Silane Compound

The primer composition of this embodiment can also include an isocyanate silane compound. From the perspective of obtaining superior water resistant adhesion with respect to glass, the primer composition preferably includes the isocyanate silane compound. When the isocyanate silane compound is included, visibility when applying, achromatization over time, and adhesion of the primer composition are superior. A content of the isocyanate silane compound is preferably not less than 100 parts by mass and not more than 300 parts by mass per 100 parts by mass of the binder resin. When the content is within this range, initial adhesion and water resistant adhesion with respect to non-adhesive/non-adhesive coated boards will be more excellent.

The isocyanate silane compound used in the primer composition of this embodiment preferably is a product of reacting: a compound (a) obtained by reacting trimethylolpropane and hexamethylene diisocyanate at a molar ratio of about 1:3; and an aminosilane compound (b) including at least one phenyl group and a carbon bonded to an NH, at a molar ratio of not less than 0.8 and not more than 1.2. The molar ratio of the compound (a) to the aminosilane compound (b) is preferably not less than 0.9 and not more than 1.1, and more preferably is about 1:1.

The isocyanate silane compound that can be included in the primer composition is not particularly limited, provided that it is a silane coupling agent having an isocyanate group. Examples thereof include: aromatic isocyanate silanes obtained by combining at least one type of a polyisocyanate compound selected from the group consisting of an adduct formed from 1,1,1-trimethylolpropane (TMP) and tolylene diisocyanate (TDI), and an adduct formed from TMP and xylylene diisocyanate (XDI), and at least one type of a silane compound selected from the group consisting of N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, N-phenyl-γ-aminopropyltrimethoxysilane, and 3-(n-propylamino)propyltrimethoxysilane; and aliphatic isocyanate silanes such as isocyanate propyltrimethoxysilane and isocyanate propyltriethoxysilane.

Particularly, from the perspective of obtaining superior water resistant adhesion with respect to glass, aliphatic isocyanate-silane compounds are preferable. A single isocyanate silane compound can be used or a combination of two or more isocyanate silane compounds can be used.

Additionally, examples of the silane compound included in the primer composition include at least one type of alkoxysilyl group-containing compound selected from the group consisting of an isocyanate silane and a reaction product of aminosilane and epoxy silane. The alkoxysilyl group-containing compound is a reaction product of an isocyanate compound having an alkoxysilyl group or an aminosilane having an alkoxysilyl group with an epoxy silane.

The alkoxysilyl group is not particularly limited, provided that it is a group in which not less than 1 and not more than 3 alkoxy groups are bonded to the silicon atom. Examples of the alkoxy group include methoxy groups, ethoxy groups, and propoxy groups. When one or two alkoxy groups are bonded to the silicon atom, examples of groups other than the alkoxy groups bonded to the silicon atom include alkyl groups such as methyl groups and ethyl groups. Examples of the alkoxysilyl group include trimethoxysilyl groups, triethoxysilyl groups, dimethoxy methylsilyl groups, dimethoxy ethylsilyl groups, diethoxy methylsilyl groups, and diethoxy ethylsilyl groups. The alkoxysilyl group is preferably a trimethoxysilyl group or a methyl dimethoxy silyl group. Trimethoxysilyl groups and methyl dimethoxy silyl groups have excellent adhesion with respect to glass and metal, and have more excellent water resistant adhesion.

Examples of the isocyanate silane compound include compounds having at least one isocyanate group and at least one alkoxysilyl group in the molecule and, specifically, the at least one isocyanate group and the at least one alkoxysilyl group are bonded to a hydrocarbon group having not less than 1 carbon. Examples of the hydrocarbon group include at least one type selected from the group consisting of aliphatic hydrocarbon groups, cycloaliphatic hydrocarbon groups, unsaturated aliphatic hydrocarbon groups, and aromatic hydrocarbon groups. Additionally, the hydrocarbon group can have urethane bonds, urea bonds, and thiourethane bonds.

Examples of the isocyanate silane compound include compounds expressed by general formula (7) below.

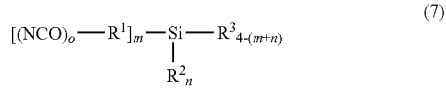

(7)

In general formula (7), $R^1$ is a hydrocarbon group having at least one type of bond selected from the group consisting of urethane bonds, urea bonds, and thiourethane bonds; $R^2$ is an alkoxy group; $R^3$ is an alkyl group; m is an integer not less than 1 and not greater than 3; n is an integer not less than 1 and not greater than 3; o is an integer not less than 1 and not greater than 3; and m+n equals an integer of not less than 2 and not greater than 4.

The hydrocarbon group that can have at least one type of bond selected from the group consisting of urethane bonds, urea bonds, and thiourethane bonds preferably has not less than 1 and not more than 8 carbon. Examples of the hydrocarbon group include aliphatic hydrocarbon groups such as methylene groups, ethylene groups, trimethylene groups, tetramethylene groups, pentamethylene groups, hexamethylene groups, heptyl groups, and octyl groups; and aromatic hydrocarbon groups such as phenylene groups and xylylene groups. The hydrocarbon group can include an aromatic hydrocarbon group such as a phenyl group as the side chain.

Examples of $R^1$, an aliphatic isocyanate-silane compound including only carbon atoms and hydrogen atoms, include isocyanate propyltrimethoxysilane, isocyanate propyltriethoxysilane, isocyanate propylmethyldimethoxysilane, and isocyanate propylmethyldiethoxysilane.

As described above, the hydrocarbon group can include urethane bonds, and these urethane bonds can have a structure derived from urethane prepolymers. Examples of urethane prepolymers that can be used to form the hydrocarbon group having urethane bonds include products obtained from 1,1,1-trimethylolpropane (TMP) and at least one selected from the group consisting of tolylene diisocyanate (TDI), xylylene diisocyanate (XDI), and hexamethylene diisocyanate (HDI).

Examples of the isocyanate silane compound that can be included in the primer composition include aromatic isocyanate silanes obtained by combining at least one type of polyisocyanate compound (urethane prepolymer) selected from the group consisting of an adduct of trimethylolpropane (TMP) and tolylene diisocyanate (TDI), and an adduct of 1,1,1-trimethylolpropane (TMP) and xylylene diisocyanate (XDI); and at least one type of aminosilane compound selected from the group consisting of N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, N-phenyl-γ-aminopropyltrimethoxysilane, and 3-(n-propylamino)propyltrimethoxysilane.

Additionally, examples include aliphatic isocyanate-silane compounds obtained by reacting an aliphatic urethane prepolymer such as an adduct of 1,1,1-trimethylolpropane (TMP) and hexamethylene diisocyanate (HDI), an HDI biuret, an HDI isocyanurate, or an HDI-TDI isocyanurate; and a compound containing active hydrogen groups or alkoxysilyl groups that are reactable with isocyanate groups (e.g. aminosilanes such as 3-(N-phenyl)aminopropyltrimethoxysilane, and mercaptosilanes).

Particularly, from the perspective of obtaining superior water resistant adhesion with respect to glass, the isocyanate silane compound is preferably an aliphatic isocyanate-silane compound. The aliphatic isocyanate-silane compound is a compound in which isocyanate groups or alkoxysilyl groups are bonded to aliphatic hydrocarbon groups.

Additionally, from the perspective of obtaining superior water resistant adhesion with respect to glass, a reaction product obtained by reacting one of analiphatic urethane prepolymer, biuret, HDI isocyanurate, and HDI-TDI isocyanurate, with a compound having active hydrogen groups and alkoxysilyl groups that are reactable with isocyanate groups is preferable; and a reaction product of one of an adduct (urethane prepolymer) of 1,1,1-trimethylolpropane (TMP) and hexamethylene diisocyanate (HDI), HDI biuret, HDI isocyanurate, and HDI-TDI isocyanurate, with 3-(N-phenylpropyl) trimethoxysilane or 3-mercaptopropyltrimethoxysilane is more preferable.

A method of producing the isocyanate silane compound is not particularly limited, and examples thereof include conventionally known methods. When the isocyanate silane compound is a compound in which at least one isocyanate group and at least one alkoxysilyl group are bonded to a hydrocarbon group having, for example, urethane bonds, urea bonds, or thiourethane bonds, the manufacture of said compound may include a reaction product obtained by reacting a polyisocyanate having at least two isocyanate groups with a compound having active hydrogen groups and alkoxysilyl groups that are reactable with isocyanate groups at an amount such that isocyanate groups/active hydrogen groups=2.0 or greater.

The polyisocyanate used when producing the isocyanate silane compound is not particularly limited provided that it is a compound wherein two or more isocyanate groups are bonded. Examples thereof include aliphatic polyisocyanates, aromatic polyisocyanates, and urethane prepolymers. Particularly, from the perspective of obtaining superior water resistant adhesion with respect to glass, aliphatic polyisocyanates and urethane prepolymers obtained from aliphatic polyisocyanates are preferable.

The aliphatic polyisocyanate is a compound wherein two or more isocyanate groups are bonded to an aliphatic hydrocarbon group. From the perspective of obtaining superior adhesion to an adherend, the number of carbons included in the aliphatic hydrocarbon group is preferably not less than 3 and not more than 12. Examples of the aliphatic polyisocyanate include open-chain aliphatic polyisocyanates such as hexamethylene diisocyanates; and alicyclic polyisocyanates such as isophorone diisocyanates, hydrogenated xylylene diisocyanates, and hydrogenated dicyclohexylmethane diisocyanates; and aralkyl polyisocyanates such as xylylene diisocyanates.

With regards to the urethane prepolymer obtained from the aliphatic polyisocyanate, the aliphatic polyisocyanate used when manufacturing is not particularly limited, and examples thereof include the same examples described above. Additionally, with regards to the urethane prepolymer obtained from the aliphatic polyisocyanate, the polyol used when manufacturing is not particularly limited, and examples thereof include trimethylolpropane, polyoxypropylene glycol, and polyoxypropylene triol. The manufacture of the urethane prepolymer obtained from the aliphatic polyisocyanate is not particularly limited. Examples thereof include conventionally known products.

Particularly, from the perspective of obtaining superior water resistant adhesion with respect to glass, the polyisocyanate used when manufacturing the isocyanate silane compound is preferably a polyisocyanate having an isocyanate group bonded to an open-chain aliphatic hydrocarbon group, or a urethane prepolymer obtained from an aliphatic polyisocyanate in which an isocyanate group is bonded to an open-chain hydrocarbon group; and more preferably a urethane prepolymer obtained from a hexamethylene diisocyanate, a hydrogenated xylylene diisocyanate, a xylylene diisocyanate, or an aliphatic polyisocyanate.

From the perspective of obtaining superior water resistant adhesion of the primer, the isocyanate group of the polyisocyanate used when manufacturing the isocyanate silane compound is preferably at least bifunctional and at most tetrafunctional.

A single polyisocyanate can be used or a combination of two or more polyisocyanates can be used.

In the compound having active hydrogen groups and alkoxysilyl groups that are reactable with isocyanate groups, examples of the active hydrogen groups that are reactable with the isocyanate groups include amino groups, mercapto groups, and hydroxy groups. Particularly, from the perspective of obtaining superior adhesion to an adherend, amino groups and mercapto groups are preferable.

In the compound having active hydrogen groups and alkoxysilyl groups that are reactable with isocyanate groups, the alkoxysilyl groups are not particularly limited. Examples thereof include trimethoxysilyl groups, triethoxysilyl groups, dimethoxy methylsilyl groups, dimethoxy ethylsilyl groups, diethoxy methylsilyl groups, and diethoxy ethylsilyl groups.

In the compound having active hydrogen groups and alkoxysilyl groups that are reactable with isocyanate groups, organic groups in which the active hydrogen groups and alkoxysilyl groups that are reactable with isocyanate groups are bonded are not particularly limited.

Examples thereof include at least one selected from the group consisting of aliphatic hydrocarbon groups, cycloaliphatic hydrocarbon groups, and aromatic hydrocarbon groups.

Examples of compounds including alkoxysilyl groups and, as the active hydrogen groups, amino groups that are reactable with an isocyanate group include secondary amines such as N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, 3-(n-propylamino)propyltrimethoxysilane, and N-phenyl-γ-aminopropyltrimethoxysilane. Particularly, from the perspective of obtaining superior water resistant adhesion, a secondary amine is preferably included, and N-phenyl-γ-aminopropyltrimethoxysilane and N-butyl-γ-aminopropyltrimethoxysilane are more preferable.

Examples of compounds including alkoxysilyl groups and, as the active hydrogen groups, mercapto groups that are reactable with an isocyanate group include γ-mercaptopropyltrimethoxysilane, γ-mercaptopropyltriethoxysilane, γ-mercaptopropylmethyldimethoxysilane, γ-mercaptopropylmethyldiethoxysilane, and γ-mercaptopropylethyldiethoxysilane.

With the compound having active hydrogen groups and alkoxysilyl groups that are reactable with isocyanate groups, a single type of each component may be used or a combination of two or more of each component may be used.

From the perspective of obtaining superior water resistant adhesion, the reaction between the polyisocyanate having two or more isocyanate groups and the compound having active hydrogen groups and alkoxysilyl groups that are reactable with isocyanate groups is preferably carried out such that isocyanate groups/active hydrogen groups=2.0 or greater and more preferably not less than 2.0 and not greater than 4.0.

A single isocyanate silane compound can be used or a combination of two or more isocyanate silane compounds can be used.

Silane Compound

The primer composition of this embodiment can also include a silane compound. When the primer composition includes the silane compound, visibility when applying, achromatization over time, and adhesion of the primer composition are superior.

The silane compound used in the primer composition of this embodiment preferably includes at least one reactant selected from a compound (1) expressed by the general formula (2) above, a compound (2) expressed by the general formula (3) above, and a compound (3) expressed by the general formula (4) above.

A content of the silane compound is preferably not less than 100 parts by mass and not more than 300 parts by mass per 100 parts by mass of the binder resin. When the content is within this range, initial adhesion and water resistant adhesion with respect to non-adhesive/non-adhesive coated boards will be more excellent.

Aminosilane Compound

The silane compound of this embodiment includes an aminosilane compound having a structure expressed by general formula (8) below.

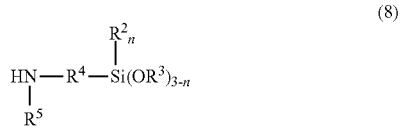

$$HN-R^4-Si(OR^3)_{3-n} \quad \underset{R^5}{\overset{R^2_n}{|}} \tag{8}$$

In formula (8), $R^2$ and $R^3$ are each alkyl groups, that may be branched, having from 1 to 8 carbons, and may be the same or different; $R^4$ is an alkylene group, that may be branched, having from 1 to 12 carbons; $R^5$ is a hydrogen atom, an alkyl group, that may be branched, having from 1 to 8 carbons, an aralkyl group, that may be branched, having from 7 to 18 carbons, or an aryl group having from 6 to 18 carbons; and n is an integer not less than 0 and not greater than 2.

The aminosilane compound does not only function as a curing agent of the epoxy silane compound, but also has excellent compatibility with modified silicone-based sealing materials, enhances jointing (initial and water resistant adhesion) of said sealing materials, and contributes to the enhancing of storage stability. In this embodiment, it is sufficient that at least one type of such compound is included.

The silyl group of the aminosilane compound preferably includes at least one hydrolyzable substituent, and more preferably includes two or more hydrolyzable substituents. When two or more hydrolyzable substituents are included, an adhesion imparting effect of the aminosilane compound will increase. Particularly, the silyl group preferably includes three or more hydrolyzable substituents.

Specific examples of the hydrolyzable substituent include hydrogen atoms, alkoxy groups, acyloxy groups (RCO—O—), amino groups, amide groups, aminooxy groups, mercapto groups, alkenyloxy groups, and the like. Particularly, alkoxy groups, having gentle hydrolysis properties, are preferable. Note that the hydrolysis rate and time required for the onset of adhesion can be adjusted according to use by the selection of the hydrolyzable substituent.

Examples of the alkyl group, which may be branched, having from 1 to 8 carbons, represented by $R^2$ and $R^3$ include methyl groups, ethyl groups, propyl groups, isopropyl groups, n-butyl groups, isobutyl groups, sec-butyl groups, tert-butyl groups, n-pentyl groups, isopentyl groups, neopentyl groups, tert-pentyl groups, 1-methylbutyl groups, 2-methylbutyl groups, 1,2-dimethylpropyl groups, n-hexyl groups, n-heptyl groups, n-octyl groups, and the like. These groups may contain double bonds or triple bonds. Among these, methyl groups and ethyl groups are preferable. Note that $R^2$ and $R^3$ may be the same or different.

Examples of the alkylene group, which may be branched, having from 1 to 12 carbons, represented by $R^4$, include methylene groups, ethylene groups, trimethylene groups, tetramethylene groups, pentamethylene groups, hexamethylene groups, octamethylene groups, decamethylene groups, dodecamethylene groups, 3,3-dimethylbutylene groups, and the like. From the perspectives of availability and obtaining superior adhesion, trimethylene groups and 3,3-dimethylbutylene groups (especially 3,3-dimethyl-1,4-butylene groups) are preferable. An alkylene group, which may be branched, having from 2 to 6 carbons is more preferable.

Examples of the compound expressed by general formula (8) above where $R^5$ is a hydrogen atom include γ-aminopropyltrimethoxysilane, γ-aminopropyltriethoxysilane, γ-aminopropylmethyldimethoxysilane, γ-aminopropylmethyldiethoxysilane, 4-amino-3,3-dimethylbutyltrimethoxysilane (all manufactured by Nippon Unicar Company Limited), and the like. Particularly, γ-aminopropyltrimethoxysilane is preferable.

Examples of the alkyl group, which may be branched, having from 1 to 8 carbons, represented by $R^5$ include methyl groups, ethyl groups, propyl groups, isopropyl groups, n-butyl groups, isobutyl groups, sec-butyl groups, tert-butyl groups, n-pentyl groups, isopentyl groups, neopentyl groups, tert-pentyl groups, 1-methylbutyl groups, 2-methylbutyl groups, 1,2-dimethylpropyl groups, n-hexyl groups, n-heptyl groups, n-octyl groups, and the like. These groups may contain double bonds or triple bonds. Among these, methyl groups and ethyl groups are preferable. Note that $R^2$ and $R^3$ may be the same or different. Particularly, an alkyl group, which may be branched, having from 2 to 4 carbons is preferable. Additionally, one or more of the hydrogen atoms in the alkyl group, represented by $R^5$, may be substituted by a substituent. The substituent is not particularly limited, but is preferably an amino group or an aminoalkyl group (having from 1 to 8 carbons), and is more preferably an amino group, an aminomethyl group, an aminoethyl group, or an aminobutyl group.

Examples of the compound expressed by general formula (8) above, where $R^5$ is an alkyl group, which may be branched, having from 1 to 8 carbons include 3-(n-butylamino)propyltrimethoxysilane (Dynasilane 1189, manufactured by Degussa-Huels AG), and the like.

Examples of the aralkyl group, which may be branched, having from 7 to 18 carbons, represented by $R^5$, include benzyl groups, phenethyl groups, and the like.

Examples of the aryl group, which may be branched, having from 6 to 18 carbons, represented by $R^5$, include phenyl groups, methylphenyl groups (toluyl groups), dimethylphenyl groups, ethylphenyl groups, and the like. Additionally, examples of a substituent in the aryl group include, in addition to the alkyl groups described above, groups including alkoxy groups such as methoxy groups, ethoxy groups, and the like; and groups including halogen atoms such as fluorine atoms, chlorine atoms, and the like. One or two or more of these substituents may be included, and sites of substitution thereof are not particularly limited.

Examples of the compound expressed by general formula (8) above, where $R^5$ is an aryl group having from 6 to 18 carbons, include N-phenyl-γ-aminopropyltrimethoxysilane (manufactured by Nippon Unicar Company Limited) and the like.

One type of the aminosilane compound described above may be used, or a combination of two more types may be used in the composition of this embodiment.

Particularly, from the perspective of the composition displaying balanced functionality at a higher level, aminosilane compounds such as N,N-bis[(3-trimethoxysilyl)propyl]amine, γ-aminopropyltrimethoxysilane, 3-butyl aminopropyltrimethoxysilane, 4-amino-3,3-dimethylbutyltrimethoxysilane, N-phenyl-γ-aminopropyltrimethoxysilane, and the like are preferable.

Reactant of the Silane Compound

The reactant of the silane compound of this embodiment includes a reaction product (hereinafter also referred to as "silane compound (B)") of a polysiloxane having two or more epoxy groups in a molecule and an aminosilane. Because the primer composition of this embodiment includes a condensation product of this silane compound (B), adhesion of urethane-based adhesives with respect to silicon hardcoats and white glass (common float glass) can be enhanced. The polysiloxane of this embodiment having two or more epoxy groups in a molecule has a siloxane bond (Si—O—Si) backbone, and has a functional group containing an epoxy group on the side chain. Examples of the functional group containing an epoxy group include γ-glycidoxypropyl groups, β-(3,4-epoxycyclohexyl)ethyl groups, and the like. From the perspective of availability, γ-glycidoxypropyl groups are particularly preferable. Examples of the polysiloxane of this embodiment having two or more epoxy groups in a molecule preferably include compounds expressed by general formula (9) below.

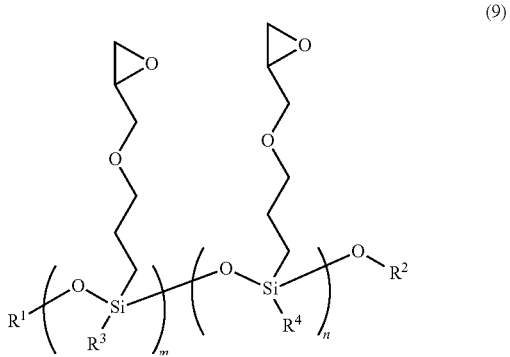

(9)

In the general formula (9) above, $R^1$ and $R^2$ represent alkyl groups having from 1 to 4 carbons, and may be the same or different. $R^1$ and $R^2$ are preferably methyl groups or ethyl groups. Moreover, $R^3$ and $R^4$ represent alkyl groups having from 1 to 6 carbons, or alkoxy groups having from 1 to 4 carbons, and may be the same or different. $R^3$ and $R^4$ are preferably methoxy groups or ethoxy groups. This is because a greater amount of hydrolyzable alkoxy groups included in the silane compound (B) leads to greater adhesion being obtained. Additionally, in general formula (9), m and n are integers not less than 0, and m+n≧2. Particularly, when m+n=2, viscosity of the reactant will be low and workability will be good, and thus it is preferable.

The compound expressed by general formula (9) can, for example, be synthesized as follows: Mixing a compound including epoxy groups in the molecule and having trialkoxysilyl groups or dialkoxysilyl groups at ends thereof such as γ-glycidoxypropyltrimethoxysilane, γ-glycidoxypropyltriethoxysilane, or a mixture thereof (hereinafter referred to as the "epoxy silane"), and water at a molar ratio of 2:1 in a reaction vessel; and condensation reacting at room temperature for not less than 8 hours and not more than 20 hours. In this case, a value of m+n of the general formula (9) can be controlled by modifying the ratio of the epoxy silane to the water.

The aminosilane reacted with the compound expressed by general formula (9) above is preferably an aminosilane having one or two amino groups, and more preferably an aminosilane having one amino group in a molecule. This is because the number of epoxy groups and hydrolyzable alkoxy groups that can be included in a molecule of the silane compound (B) of this embodiment will be greater. Additionally, the amino group is preferably a primary or secondary amino group. The silane compound (B) of this embodiment can be obtained via the reaction of the epoxy groups included in the polysiloxane and the amino groups contained in the aminosilane. In this embodiment, a reaction ratio of these groups (amino groups/epoxy groups) is, in terms of a molar ratio, not less than 0.1 and not more than 1.0, preferably not less than 0.3 and not more than 1.0, and more preferably not less than 0.5 and not more than 1.0. When the reaction ratio is within this range, the balance of the hydrolyzable alkoxysilanes included in the obtained silane compound (B) will be good, and the desired adhesion can be obtained.

Examples of the aminosilane that can be used in this embodiment include γ-aminopropyltrimethoxysilane, γ-aminopropyltriethoxysilane, γ-aminopropylmethyldimethoxysilane, γ-aminopropylethyldiethoxysilane, bistrimethoxysilylpropylamine, bistriethoxysilylpropylamine, bismethoxydimethoxysilylpropylamine, bisethoxydiethoxysilylpropylamine, N-β(aminoethyl)γ-aminopropyltrimethoxysilane, N-β(aminoethyl)γ-aminopropylmethyldimethoxysilane, N-β(aminoethyl)γ-aminopropyltiethoxysilane, N-β(aminoethyl)γ-aminopropylethyldiethoxysilane, and the like. Particularly, for the reasons described above, γ-aminopropyltrimethoxysilane, γ-aminopropyltriethoxysilane, and bistrimethoxysilylpropylamine are preferable. One type of the aminosilane described above may be used, or a combination of two more types may be used.

Examples of a method for manufacturing the silane compound (B) of this embodiment include mixing the compound expressed by general formula (9) obtained by the method described above, and the aminosilane; and reacting the mixture at not less than 40 degrees and not more than 50 degrees for not less than 16 hours and not more than 48 hours. Reaction can take place in the presence of a volatile solvent such as methyl ethyl ketone, ethyl acetate, or the like, and an added amount of said volatile solvent is preferably in a range of not less than 0 and not more than 50 mass %.

The silane compound (B) obtained as described above has good balance with the alkoxysilanes included in the molecule and provides excellent adhesion. Additionally, the silane compound (B) has the structure described above, specifically, a structure where the backbone is a siloxane bond and a reactive functional group extends in parallel on the side chain. Therefore, excellent adhesion with respect to non-porous substrates such as acrylic/acrylic-coated boards, glass, silicone hardcoated resin glass, and the like can be obtained due to the mesh structure obtained after curing the composition having a suitable crosslink density.

Curing Catalyst

The primer composition of this embodiment can also further include a curing catalyst. By including the curing catalyst, onset of adhesion will be faster, and sufficient adhesion can be obtained when used in low-temperature environments. Examples of the curing catalyst include metal-based catalysts, amine-based catalysts, and the like.

Examples of the metal-based catalysts include tin carboxylates such as dimethyltin dilaurate, dibutyltin dilaurate, dibutyltin maleate, dibutyltin diacetate, dioctyltin dilaurate, tin naphthenate, and the like; titanate esters such as tetrabutyl titanate, tetrapropyl titanate, and the like; organic aluminum compounds such as aluminum tris-acetylacetonate, aluminum tris-ethyl acetoacetate, diisopropoxyaluminum ethyl acetoacetate, and the like; chelate compounds such as zirconium tetra-acetylacetonate, titanium tetra-acetylacetonate, and the like; octonoic acid metal salts such as lead octonoic acid, bismuth octonoic acid, and the like; and the like.

Examples of the amine-based catalysts include tertiary amines such as triethylamine, triethylenediamine, dimethylaminoethylmorpholine, and the like.

A single type of the curing catalyst may be used or a combination of two or more may be used. A content of the curing catalyst is preferably not less than 0.001 parts by mass and not more than 1.0 parts by mass, and more preferably not less than 0.001 parts by mass and not more than 0.6 parts by mass per 100 parts by mass of the polyisocyanate compound.

Additives

As necessary, the primer composition of this embodiment can include various additives such as fillers, UV absorbents, dispersants, dehydrating agents, adhesion promoter, and the like, in a range that does not inhibit the effects of this embodiment. The filler can be an organic or inorganic filler of any form. Specific examples thereof include fumed silica, calcined silica, precipitated silica, pulverized silica, molten silica; diatomaceous earth; iron oxide, zinc oxide, titanium oxide, barium oxide, magnesium oxide; calcium carbonate, magnesium carbonate, zinc carbonate; pyrophyllite clay, kaolin clay, calcined clay; fatty acid treated products, resin acid treated products, urethane compound treated products, and fatty acid ester treated products thereof; and the like.

A method of fabricating the primer composition of this embodiment is not particularly limited. For example, a method can be used in which each of the essential components and the optional components described above are thoroughly mixed in a closed vessel using a mixer such as a combination mixer or the like.

Adherends to which the primer composition of this embodiment is applied are not particularly limited, but examples thereof include glass, metals, wooden materials, plastics, and coated boards thereof. Examples of non-adhesive/non-adhesive coated boards include acrylic/acrylic coated boards, epoxy/epoxy coated boards, silicone/silicone coated boards, and the like.

The following effects can be obtained according to the primer composition of this embodiment described above. Specifically, by including the compound (A) expressed by the general formula (1) at the stipulated amount together with the binder resin and the solvent, it is easy to determine whether or not the primer composition has been applied because the state of application can be visually confirmed when applying. Additionally, with the primer composition of this embodiment, because the state of application can be visually confirmed when applying and achromatization occurs over time by exposure to sunlight outdoors for a certain amount of time, care in preventing overspill when applying is not necessary and, therefore, a primer composition by which workability can be enhanced, and that has superior aesthetics without negatively affecting the appearance of the coated board can be provided.

Therefore, the primer composition of this embodiment can be suitably used in, for example, adhesives and sealants (sealing materials), and suitable examples thereof include urethane-based, urethane epoxy-based, and other adhesives or sealants. Particularly, the primer composition of this embodiment is useful as a primer used when adhering window sealant and a non-adhesive/non-adhesive coated board, or window sealant and glass.

A method for adhering window sealant and a non-adhesive/non-adhesive coatedboard, and window sealant and glass using the primer composition of this embodiment is described below. A first adherend is a coated steel plate used in the body of an automobile or the like. Examples thereof include non-adhesive/non-adhesive coated boards such as electrocoated steel plates or the like on which an acryl melamine coating is baked, float glass, and the like. The window sealant is used to adhere the window pane to the body of the automobile, and examples thereof include commonly used polyurethane-based sealants and the like. Commercially available products such as, for example, WS-202 (manufactured by The Yokohama Rubber Co., Ltd.) and the like can be used as the window sealant.

EXAMPLES

The embodiment is described in detail below using Examples, but the embodiment is not limited to these Examples.

Primer Composition

Primer compositions were obtained by mixing the components according to the compositions shown in Table 1 below (shown as parts by weight) using a mixer.

Visibility

Samples were fabricated by applying the obtained primer compositions to acrylic/acrylic coated boards or to float glass. Appearances of the samples immediately following application were visually observed, and an evaluation was made as to whether or not it could be determined if the primer solutions had been applied to the acrylic/acrylic coated boards or to the float glass. When the primer composition had coloration and it was possible to determine whether the primer composition had been applied to the coated board, an evaluation of "○" was given, indicating superior visibility. When the primer composition was transparent and it was impossible to determine whether the primer composition had been applied to the coated board, an evaluation of "X" was given, indicating inferior visibility. The evaluation results are shown in Table 1 below.

Achromatization

The samples fabricated above for the evaluation of visibility were exposed to sunlight outside for three days, and a ratio of achromatization from the color of the primer composition at the time of coloration was evaluated. When the primer composition achromatized and became transparent, an evaluation of "○" was given, indicating superior achromatization. Note that for Comparative Example 1, in which the compound A (dye) was not included, achromatization could not be evaluated and is shown as "--" in Table 1. The evaluation results are shown in Table 1 below.

Adhesion

For Comparative Example 1 and Working Examples 1-1, 1-2, and 1-3, the obtained primer compositions were applied to acrylic/acrylic coated boards. For Working Examples 2-1, 2-2, and 2-3; and Working Examples 3-1, 3-2, and 3-3, the obtained primer compositions were applied to float glass. After being allowed to sit at 20° C. for two minutes, a urethane-based window sealant (WS-202, manufactured by The Yokohama Rubber Co., Ltd.) was applied so as to have a thickness of 3 mm. Then curing was carried out under the conditions described below. Thus, test samples were obtained.

Curing Conditions

Initial adhesion: Allowed to sit in a 20° C., 65% RH environment for seven days.

Water resistant adhesion: Allowed to sit in a 20° C., 65% RH environment for seven days. Thereafter, immersed in 20° C. warm water for 14 days.

Heat resistant adhesion: Allowed to sit in a 20° C., 65% RH environment for seven days. Thereafter, allowed to sit in an 80° C. atmosphere for 14 days.

Evaluation Method for Adhesion

The window sealant of the obtained test samples was cut using a knife. Then, the cut portion was gripped by hand and pulled. Adhesion was evaluated by observing the peeling condition of the cut portion. Adhesion was evaluated as follows. A percentage (%) of the cohesive failure (CF) area with respect to the adhesive failure (AF) area and the cohesive failure (CF) area of the window sealant with respect to the adhesion area was calculated. Higher CF percentages were evaluated to indicate superior adhesion. For example, when the percentage of the cohesive failure area of the window sealant with respect to the adhering surface area was 80%, "CF80" was recorded, and when the percentage of the cohesive failure area was 100%, "CF 100" was recorded. The evaluation results are shown in Table 1 below.

TABLE 1

|  | Comparative Example 1 | Working Example 1-1 | Working Example 1-2 | Working Example 1-3 |
|---|---|---|---|---|
| Binder resin (acrylic resin) | 1 | 1 | 1 | 1 |
| Binder resin (polyester resin) | 2.5 | 2.5 | 2.5 | 2.5 |
| Binder resin (urethane resin) | — | — | — | — |
| Polyisocyanate compound | 30 | 30 | 30 | 30 |
| Polyisocyanate silane compound | — | — | — | — |
| Silane compound | — | — | — | — |
| Compound A | 0 | 0.135 | 1.335 | 2.0025 |
| Solvent | 100 | 100 | 100 | 100 |
| Solid content | 8.7 | 8.8 | 9.6 | 10.0 |
| Compound A content | 0.00 | 0.10 | 1.00 | 1.50 |
| Visibility | x | ○ | ○ | ○ |
| Achromatization | — | ○ | ○ | ○ |
| Initial adhesion to acrylic/acrylic coated board | CF100 CF100 CF100 | CF100 CF100 CF100 | CF100 CF100 CF100 | CF100 CF100 CF100 |
| Initial adhesion for float glass | — — — | — — — | — — — | — — — |

|  | Working Example 2-1 | Working Example 2-2 | Working Example 2-3 | Working Example 3-1 | Working Example 3-2 | Working Example 3-3 |
|---|---|---|---|---|---|---|
| Binder resin (acrylic resin) | — | — | — | 5 | 5 | 5 |
| Binder resin (polyester resin) | — | — | — | — | — | — |
| Binder resin (urethane resin) | 5 | 5 | 5 | — | — | — |
| Polyisocyanate compound | — | — | — | — | — | — |
| Polyisocyanate silane compound | 10 | 10 | 10 | — | — | — |
| Silane compound | — | — | — | 10 | 10 | 10 |
| Compound A | 0.115 | 1.15 | 1.725 | 0.115 | 1.2 | 1.725 |
| Solvent | 100 | 100 | 100 | 100 | 100 | 100 |
| Solid content | 13.1 | 13.9 | 14.3 | 13.1 | 13.9 | 14.3 |
| Compound A content | 0.10 | 1.00 | 1.50 | 0.10 | 1.00 | 1.50 |
| Visibility | ○ | ○ | ○ | ○ | ○ | ○ |
| Achromatization | ○ | ○ | ○ | ○ | ○ | ○ |
| Initial adhesion to acrylic/acrylic coated board | — — — | — — — | — — — | — — — | — — — | — — — |
| Initial adhesion for float glass | CF100 CF100 CF100 | CF100 CF100 CF100 | CF100 CF100 CF100 | CF100 CF100 CF100 | CF100 CF100 CF100 | CF100 CF100 CF100 |

The components listed in Table 1 are described below.

Binder resin (acrylic resin): Delpowder 80N, manufactured by Asahi Kasei Corporation; number average molecular weight: 100,000

Binder resin (polyester resin): Vylon GK810, manufactured by Toyobo Co. Ltd.; number average molecular weight: 6,000; glass transition temperature: 46° C.; acidic component: terephthalic acid, isophthalic acid, and sebacic acid Binder resin (urethane resin): Pandex T5205, manufactured by DIC Corporation; number average molecular weight: 60,000

Polyisocyanate compound: Desmodur RFE, manufactured by Sumika Bayer Urethane Co., Ltd.; nonvolatile content (solid content): 27 mass %

Polyisocyanate silane compound: Reactant of Takenate D160N, manufactured by Mitsui Chemicals Polyurethanes, Inc., HDI-TPM adduct; and KBM-573, manufactured by Shin-Etsu Chemical Co., Ltd., N-phenyl-γ-aminopropyltrimethoxysilane, reacted at a 1:1 molar ratio.

Silane compound: Reactant of Z-6094, manufactured by Dow Corning Toray, 3-(2-aminoethyl)aminopropyltrimethoxysilane; Z-6044, manufactured by Dow Corning Toray, 3-glycidoxypropyldimethoxysilane; and A-187, manufactured by Momentive Performance Materials Inc., 3-glycidoxypropyltrimethoxysilane, reacted at a 1:1.5:0.7 molar ratio.

Compound A (dye): Erythrosine, manufactured by Kiriya Chemical Co., Ltd.; molecular weight: 897.86, hydrate of formula (1)

Solvent: Ethyl acetate

In Table 1, solid content is shown in terms of mass % with respect to the total mass of the primer composition. The content of the compound (A) is shown in terms of mass % with respect to the total mass of the primer composition.

It is clear from the results shown in Table 1 that each of the Working Examples 1-1 to 1-3, Working Examples 2-1 to 2-3 and Working Examples 3-1 to 3-3 had superior visibility and achromatization, and excellent adhesion. It is also clear from Working Example 1-1 to 1-3 that even in cases where the polyisocyanate compound is included, visibility, achromatization, and adhesion with respect to an acrylic/acrylic coated board is superior. Additionally, it is clear from Working Examples 2-1 to 2-3 that even in cases where the polyisocyanate silane compound is included, visibility, achromatization, and adhesion with respect to float glass is superior. Furthermore, it is clear from Working Examples 3-1 to 3-3 that even in cases where the silane compound is included, visibility, achromatization, and adhesion with respect to float glass is superior. In contrast, it is clear that Comparative Example 1, which did not include the compound A (dye), had inferior visibility.

Thus, by using a primer composition including a binder resin, a solvent, and not less than 0.1 mass % and not more than 2.5 mass %, preferably not less than 0.1 mass % and not more than 2.0 mass %, and more preferably not less than 0.1 mass % and not more than 1.5 mass % of the compound (A) expressed by the general formula (1) or a hydrate thereof, the state of application can be visibility confirmed when applying and achromatization occurs over time by exposure to sunlight outdoors for a certain amount of time. Therefore, it is easy to determine whether or not the primer composition has been applied. As a result, it was discovered that superior aesthetics can be achieved without negatively affecting appearance, care in preventing overspill when applying is not necessary, and workability can be enhanced by using this primer composition.

As described above, the primer composition of the present technology is useful because workability and aesthetics can be enhanced because the application state of the primer composition can be visually confirmed and the primer composition achromatizes over time with exposure to sunlight outside. The primer composition of the present technology is particularly suited for use as a primer to be used in adhering a window sealant and a non-adhesive/non-adhesive coated-board.

What is claimed is:

1. A primer composition comprising:
   a binder resin;
   a compound (A) expressed by general formula (1) below or a hydrate thereof;
   at least one of a polyisocyanate compound, an isocyanate silane compound, and a silane compound; and
   a solvent;
   wherein a content of the compound (A) is not less than 0.1 mass % and not more than 1.5 mass %:

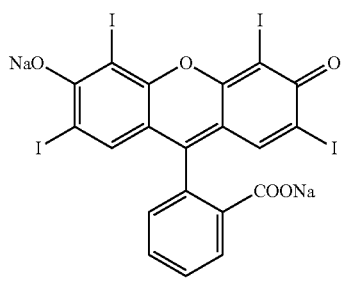

(1)

and;
   wherein the silane compound comprises at least one type of reactant selected from a compound (1) expressed by general formula (2) below, a compound (2) expressed by general formula (3) below, and a compound (3) expressed by general formula (4) below:

COMPOUND (1)

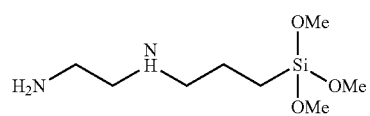

(2)

COMPOUND (2)

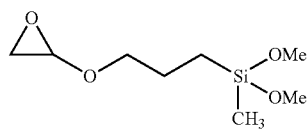

(3)

COMPOUND (3)

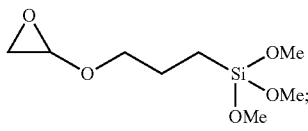

(4)

wherein the polyisocyanate compound is a tris(phenyl isocyanate) thiophosphate; and wherein the isocyanate silane compound is a product of reacting: a compound (a) obtained by reacting trimethylolpropane and hexamethylene diisocyanate; and an aminosilane compound (b) comprising at least one phenyl group and a carbon bonded to an NH.

2. The primer composition according to claim 1, wherein the binder resin comprises at least one of a polyurethane-based resin and a polyacryl-based resin.

3. The primer composition according to claim 2, wherein the primer composition includes a tris(phenyl isocyanate) thiophosphate.

4. The primer composition according to claim 2, wherein the primer composition includes an isocyanate silane compound that is a product of reacting: a compound (a) obtained by reacting trimethylolpropane and hexamethylene diisocyanate; and an aminosilane compound (b) comprising at least one phenyl group and a carbon bonded to an NH.

5. The primer composition according to claim 2, wherein the primer composition includes a silane compound that comprises at least one type of reactant selected from a compound (1) expressed by general formula (2) below, a compound (2) expressed by general formula (3) below, and a compound (3) expressed by general formula (4) below:

COMPOUND (1)

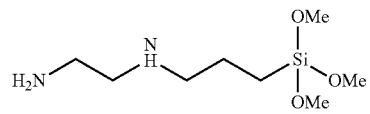

(2)

COMPOUND (2)

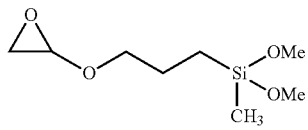
(3)

COMPOUND (3)

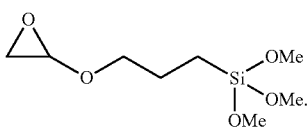
(4)

6. The primer composition according to claim 1, wherein the binder resin has a number average molecular weight of not less than 15,000.

7. The primer composition according to claim 1, wherein the binder resin includes at least one of a polyacrylate resin and a polyurethane resin, wherein a number average molecular weight of the polyacrylate resin is not less than 3,000 and not more than 150,000, and a number average molecular weight of the polyurethane resin is not less than 3,000 and not more than 60,000.

8. The primer composition according to claim 7, wherein the polyacrylate resin is a copolymer of methyl acrylate and methyl methacrylate.

9. The primer composition according to claim 7, wherein the polyurethane resin is obtained by copolymerizing monomers via urethane bonds that are formed by condensing isocyanate groups and alcohol groups.

10. The primer composition according to claim 1, wherein a content of the solvent is not less than 60 mass % and not more than 95 mass % of the gross mass of the primer composition.

11. The primer composition according to claim 1, wherein the solvent comprises one or more of methyl ethyl ketone and ethyl acetate.

12. The primer composition according to claim 1, wherein the polyisocyanate compound has three or more isocyanate groups.

13. The primer composition according to claim 12, wherein the polyisocyanate compound comprises a combination of tris(phenyl isocyanate) thiophosphate and/or polymethylene polyphenyl isocyanate and a polyisocyanate compound having isocyanurate rings.

14. The primer composition according to claim 12, wherein the polyisocyanate compound comprises a combination of tris(phenyl isocyanate) thiophosphate and a polyisocyanate compound having isocyanurate rings.

15. The primer composition according to claim 1, wherein the polyisocyanate compound is a tris(phenyl isocyanate) thiophosphate with a content of not less than 50 parts by mass and not more than 3,000 parts by mass per 100 parts by mass of the binder resin.

16. The primer composition according to claim 1, wherein the primer composition includes an isocyanate silane compound that is obtained by reacting: a compound (a) obtained by reacting trimethylolpropane and hexamethylene diisocyanate at a molar ratio of about 1:3; and an aminosilane compound (b) including at least one phenyl group and a carbon bonded to an NH, at a molar ratio of not less than 0.9 and not more than 1.1.

17. A primer composition comprising:
a binder resin;
a compound (A) expressed by general formula (1) below

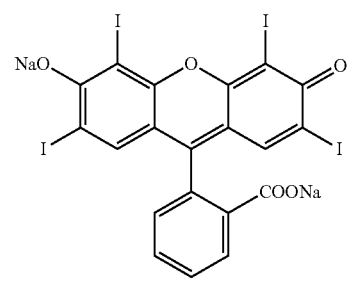
(1)

or a hydrate thereof;
a solvent; and
a polyisocyanate compound having three or more isocyanate groups,
wherein a content of the compound (A) is not less than 0.1 mass % and not more than 1.5 mass %; and
wherein the polyisocyante compound comprises a combination of tris(phenyl isocyanate) thiophosphate and/or polymethylene polyphenyl isocyanate and a polyisocyanate compound having isocyanurate rings, or the polyisocyanate compound comprises a combination of tris (phenyl isocyanate) thiophosphate and a polyisocyanate compound having isocyanurate rings.

18. A primer composition comprising:
a binder resin;
a compound (A) expressed by general formula (1) below

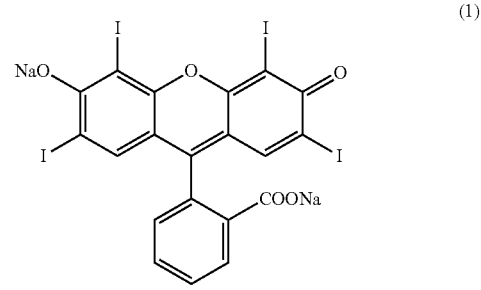
(1)

or a hydrate thereof;
a solvent; and
an isocyanate silane compound that is obtained by reacting: a compound (a) obtained by reacting trimethylolpropane and hexamethylene diisocyanate at a molar ratio of about 1:3; and an aminosilane compound (b) including at least one phenyl group and a carbon bonded to an NH, at a molar ratio of not less than 0.9 and not more than 1.1.

* * * * *